(12) United States Patent
Scherker

(10) Patent No.: US 12,552,231 B2
(45) Date of Patent: Feb. 17, 2026

(54) WINDSHIELD PROTECTION CUSHION DEVICE

(71) Applicant: Laura Scherker, Springboro, OH (US)

(72) Inventor: Laura Scherker, Springboro, OH (US)

( * ) Notice: Subject to any disclaimer, the term of this patent is extended or adjusted under 35 U.S.C. 154(b) by 261 days.

(21) Appl. No.: 18/233,715

(22) Filed: Aug. 14, 2023

(65) Prior Publication Data

US 2025/0058607 A1 Feb. 20, 2025

(51) Int. Cl.
*B60J 1/20* (2006.01)

(52) U.S. Cl.
CPC .................................. *B60J 1/2094* (2013.01)

(58) Field of Classification Search
CPC . B60J 1/2094; B60J 11/08; B60J 11/00; B60J 11/06; B60J 11/04
USPC ...................................................... 160/370.21
See application file for complete search history.

(56) References Cited

U.S. PATENT DOCUMENTS

| | | | | |
|---|---|---|---|---|
| 2,614,630 A * | 10/1952 | Moszelt | ................... | B60J 11/08 160/DIG. 3 |
| 3,152,832 A * | 10/1964 | Kamp | ...................... | B60J 11/08 248/205.5 |
| 3,923,339 A * | 12/1975 | McDonald | .............. | F41H 5/263 160/370.21 |
| 4,726,406 A | 2/1988 | Weatherspoon | | |
| 4,799,728 A * | 1/1989 | Akers | ...................... | B60J 11/00 296/136.11 |
| 4,842,324 A * | 6/1989 | Carden | ..................... | B60J 11/00 296/136.11 |
| 4,966,405 A * | 10/1990 | Tremaine | ................. | B60J 11/08 160/370.21 |
| 5,035,460 A * | 7/1991 | Huang | ..................... | B60J 11/08 160/370.21 |
| 5,037,156 A * | 8/1991 | Lundberg | ................. | B60J 11/08 160/370.21 |
| 5,275,460 A * | 1/1994 | Kraus | ...................... | B60J 11/06 160/DIG. 16 |
| 5,356,191 A * | 10/1994 | Sheehan | .................. | B60J 11/08 160/370.21 |
| 5,409,286 A * | 4/1995 | Huang | ..................... | B60J 11/00 160/370.21 |
| 5,456,515 A * | 10/1995 | Dang | ..................... | B60J 11/025 160/370.22 |
| 5,553,908 A * | 9/1996 | Shink | ....................... | B60J 11/08 160/370.21 |
| 5,664,825 A * | 9/1997 | Henke | ..................... | B60J 11/00 160/231.2 |

(Continued)

FOREIGN PATENT DOCUMENTS

WO WO9742048 11/1997

*Primary Examiner* — Johnnie A. Shablack

(57) ABSTRACT

A windshield protection cushion device includes a mat that is positionable over a windshield of a vehicle. A resiliently compressible element is integrated into the mat to absorb impact energy from a projectile thereby inhibiting the windshield from being damaged by the projectile. A plurality of tabs is coupled to and extends away from the mat. The tabs are strategically positioned on the mat thereby facilitating each of the plurality of tabs to be folded onto a respective body panel of the vehicle when the mat is positioned on the windshield. Each of the plurality of tabs has an engaging element which releasably engages the respective body panel for retaining the mat on the windshield.

7 Claims, 8 Drawing Sheets

(56) References Cited

U.S. PATENT DOCUMENTS

| | | | | |
|---|---|---|---|---|
| 5,738,403 | A * | 4/1998 | Tyson | B60J 11/06 296/136.04 |
| 6,076,577 | A * | 6/2000 | Ontaneda | B60J 11/08 160/370.21 |
| 6,220,648 | B1 * | 4/2001 | Daniel | B60J 11/00 296/136.02 |
| 6,223,760 | B1 * | 5/2001 | Hughey | B60J 11/00 135/88.01 |
| 6,241,303 | B1 * | 6/2001 | Yee | B60J 11/08 150/168 |
| 6,394,528 | B2 * | 5/2002 | Hoenack | B60J 11/00 160/370.21 |
| 6,648,396 | B2 * | 11/2003 | Monahan | B60J 1/2011 160/370.21 |
| 7,219,616 | B2 * | 5/2007 | Pritchett | B63B 17/02 114/361 |
| 8,430,445 | B1 | 4/2013 | Williams | |
| D719,882 | S | 12/2014 | Brown | |
| 9,061,575 | B2 * | 6/2015 | Singleton | B60J 11/08 |
| 9,150,088 | B2 * | 10/2015 | Yang | B60J 11/08 |
| 9,302,572 | B2 * | 4/2016 | Wang | B60J 11/04 |
| 9,476,478 | B2 * | 10/2016 | Staton | F16F 15/005 |
| 9,676,262 | B2 * | 6/2017 | Peries | B60J 11/08 |
| 9,688,129 | B2 * | 6/2017 | Mansueto | B60J 11/08 |
| 9,770,966 | B1 * | 9/2017 | Gill | B60J 11/04 |
| 9,862,259 | B2 | 1/2018 | Barnes, Jr. | |
| 10,279,660 | B2 * | 5/2019 | Nomura | B60J 1/2094 |
| 10,766,345 | B2 * | 9/2020 | Ching | B60J 11/04 |
| 10,792,987 | B1 * | 10/2020 | Trevino | B32B 21/02 |
| 11,358,443 | B2 * | 6/2022 | Tosetto | B60J 11/08 |
| 11,358,459 | B1 * | 6/2022 | Miller | B60J 1/2047 |
| 11,529,858 | B1 * | 12/2022 | Guma | E06B 9/42 |
| 11,634,019 | B2 | 4/2023 | Budynas | |
| 2006/0000529 | A1 * | 1/2006 | Le | B60J 11/08 150/168 |
| 2009/0102230 | A1 * | 4/2009 | Pehrson | B60J 11/08 296/136.13 |
| 2009/0301671 | A1 * | 12/2009 | Locklear | B60J 11/08 160/370.21 |
| 2010/0326017 | A1 * | 12/2010 | Kindel | B60J 11/00 53/461 |
| 2015/0101768 | A1 * | 4/2015 | Lee | B60J 1/2091 160/370.21 |
| 2015/0151623 | A1 * | 6/2015 | Li | B60J 11/08 160/370.21 |
| 2018/0170164 | A1 * | 6/2018 | Wingard | B32B 7/08 |
| 2019/0183277 | A1 * | 6/2019 | Dimick | B60J 11/06 |
| 2019/0329632 | A1 | 10/2019 | Neufer | |
| 2021/0252957 | A1 | 8/2021 | Swan | |

* cited by examiner

WINDSHIELD PROTECTION CUSHION DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to windshield protection devices and more particularly pertains to a new windshield protection device for protecting a windshield from being struck by a projectile. The device includes a mat that is positionable over a windshield of a vehicle. The mat includes a resiliently compressible element to absorb impact energy from the projectile thereby inhibiting the windshield from being damaged. The device includes a plurality of tabs that extend away from the mat and a plurality of magnets integrated into respective tabs for magnetically engaging body panels of the vehicle.

(2) Description of Related Art Including Information Disclosed Under 37 CFR 1.97 and 1.98

The prior art relates to windshield protection devices including a variety of windshield protection devices that includes a mat that is positionable on a windshield of a vehicle with straps that attach to structural elements of the vehicle and windshield cover comprised of interconnected panels that are positionable on a windshield and an impact resistant device that has triangular support elements. In no instance does the prior art disclose a windshield protection mat that has a resiliently compressible element integrated into the mat for absorbing impact energy and a plurality of tabs attached to the mat which are foldable onto body panels of the vehicle and magnets integrated into the tabs to magnetically engage the body panels.

(h) BRIEF SUMMARY OF THE INVENTION

An embodiment of the disclosure meets the needs presented above by generally comprising a mat that is positionable over a windshield of a vehicle. A resiliently compressible element is integrated into the mat to absorb impact energy from a projectile thereby inhibiting the windshield from being damaged by the projectile. A plurality of tabs is coupled to and extends away from the mat. The tabs are strategically positioned on the mat thereby facilitating each of the plurality of tabs to be folded onto a respective body panel of the vehicle when the mat is positioned on the windshield. Each of the plurality of tabs has an engaging element which releasably engages the respective body panel for retaining the mat on the windshield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
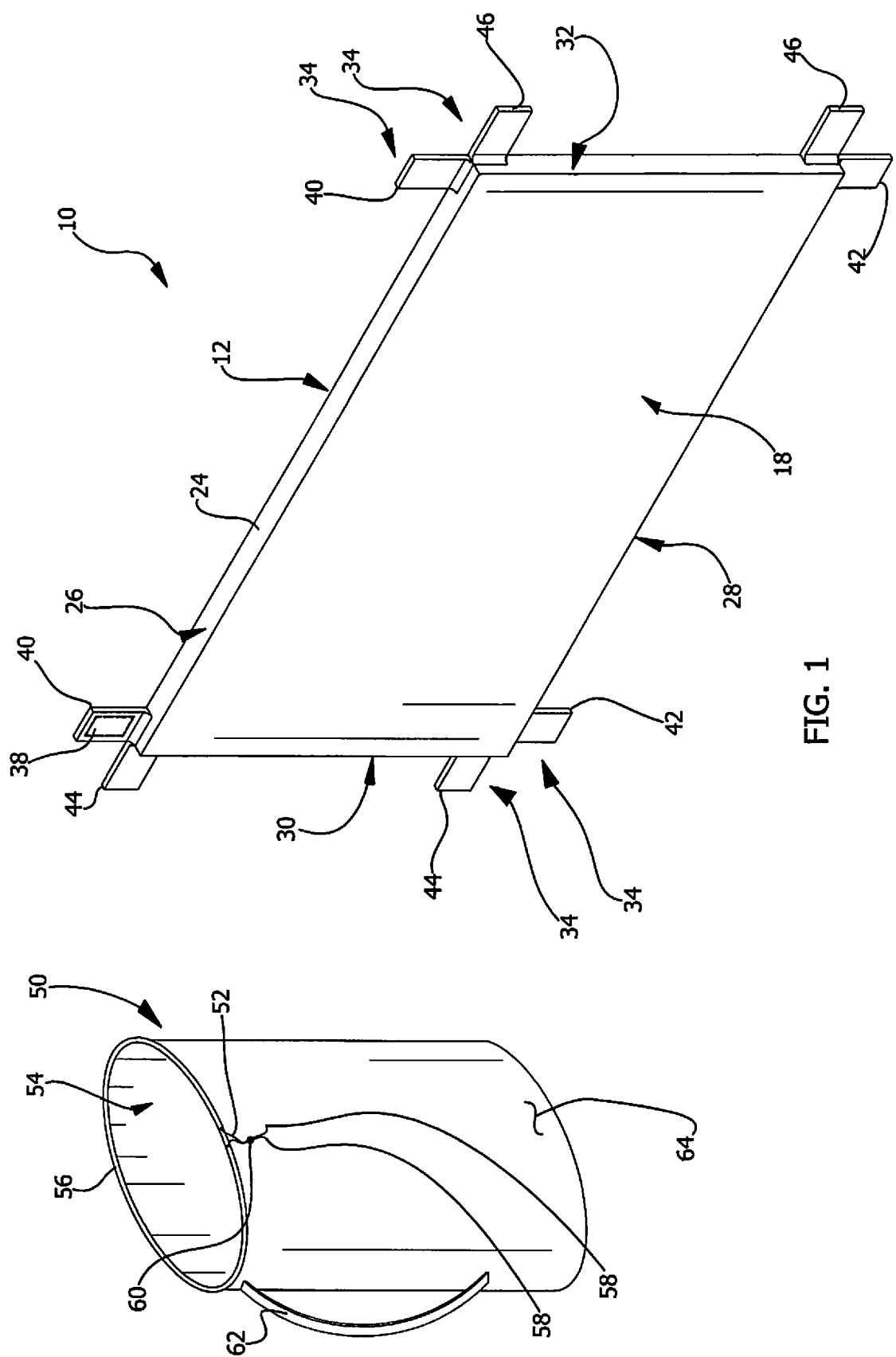
FIG. 1 is a perspective view of a windshield protection cushion device according to an embodiment of the disclosure.
Figure 2:
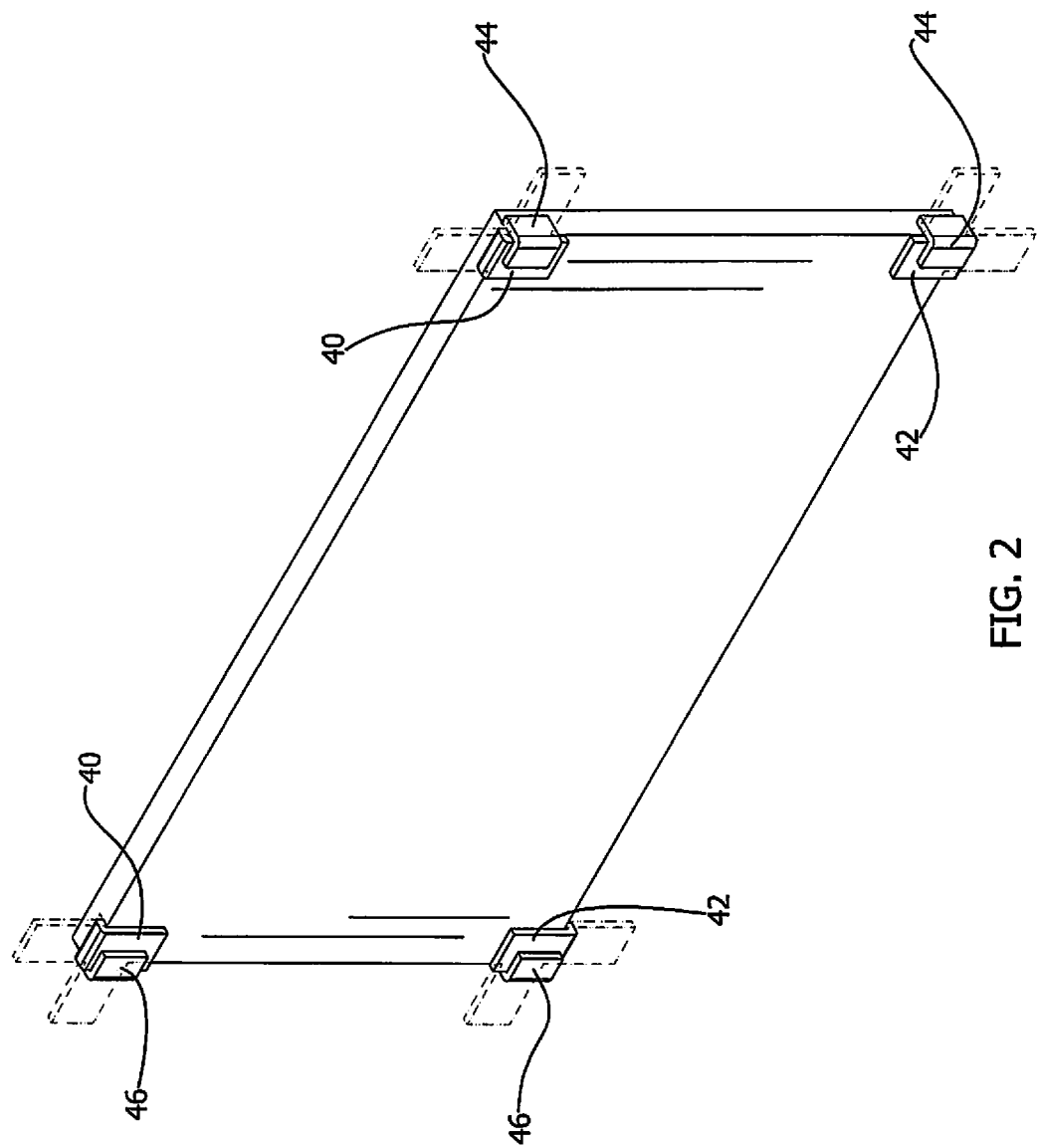
FIG. 2 is a back perspective view of a mat of an embodiment of the disclosure.
Figure 3:
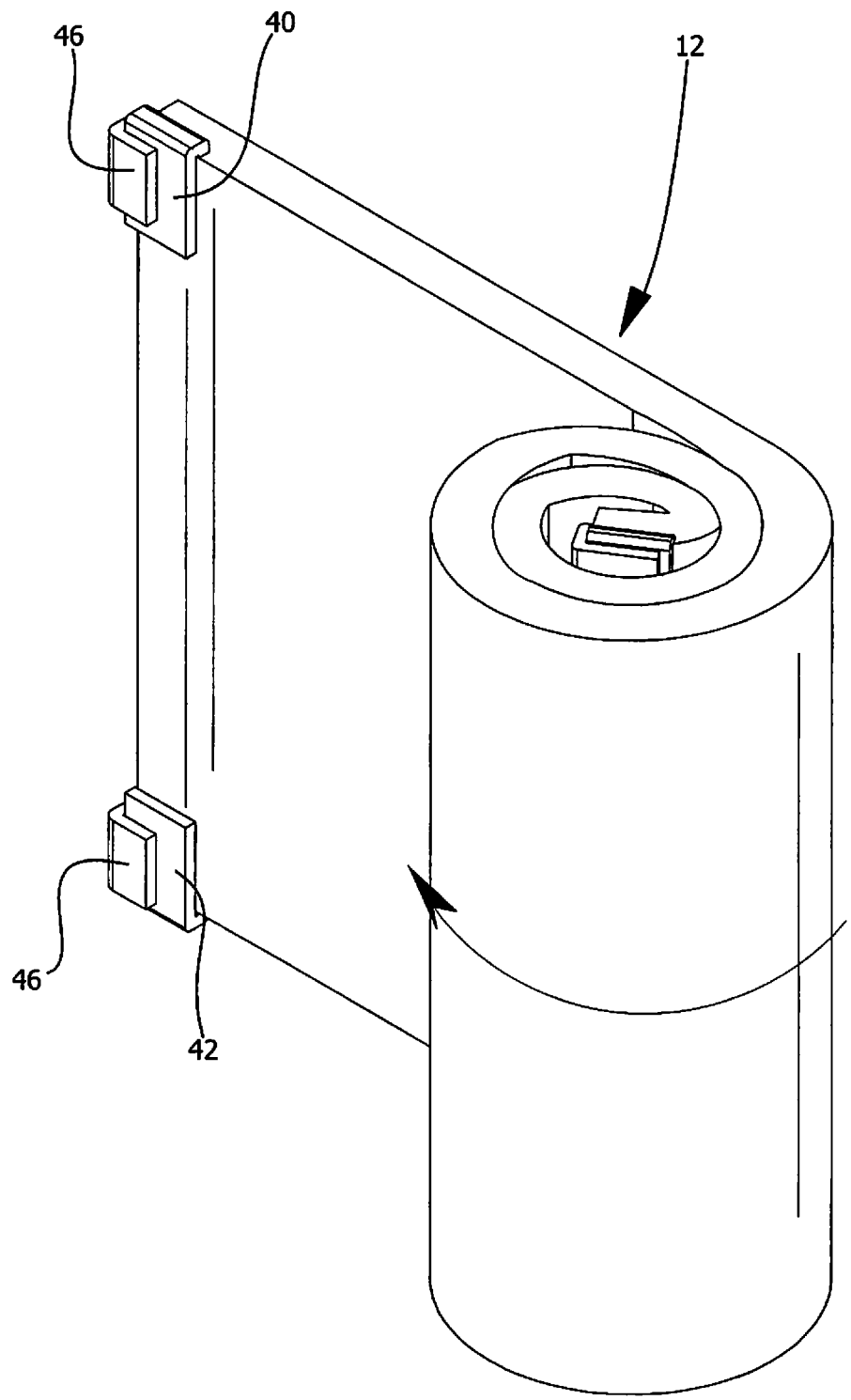
FIG. 3 is a perspective view of a mat of an embodiment of the disclosure being rolled up for storage.
Figure 4:
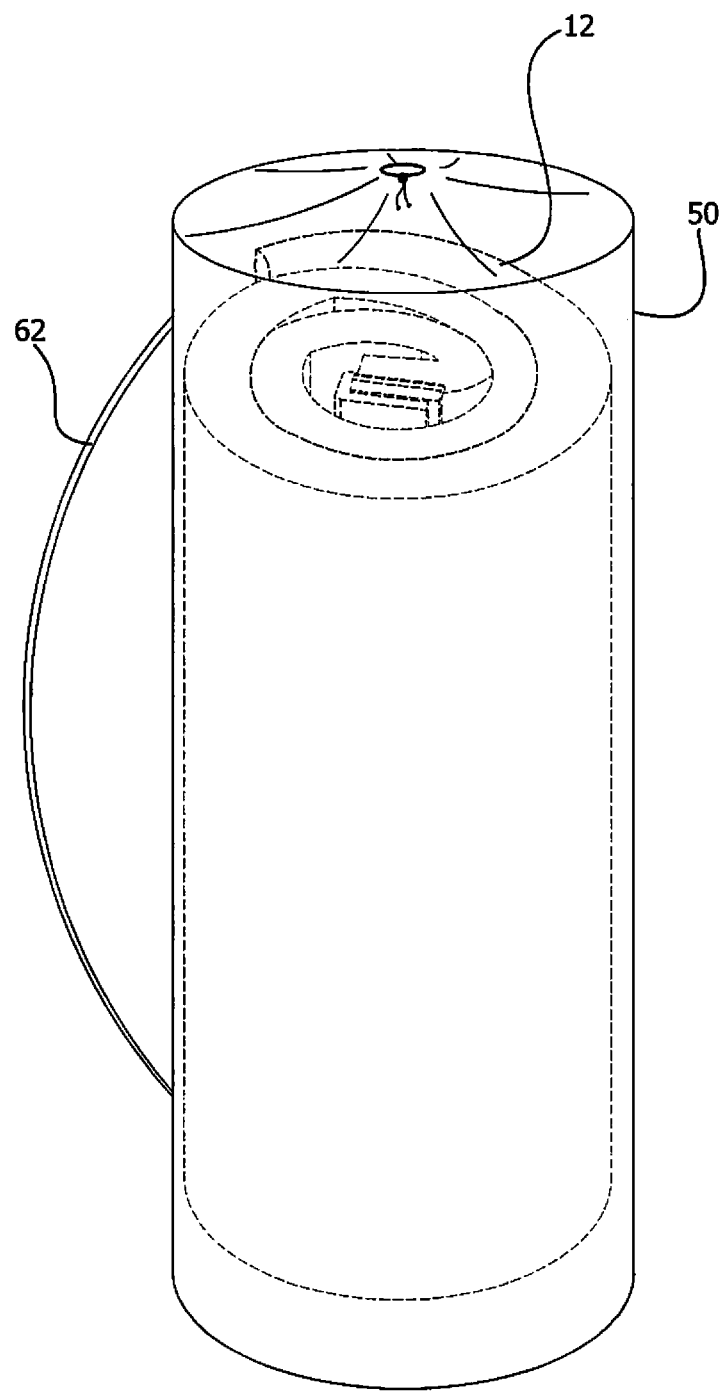
FIG. 4 is a phantom in-use view of an embodiment of the disclosure showing a mat being stored in a storage bag.
Figure 5:
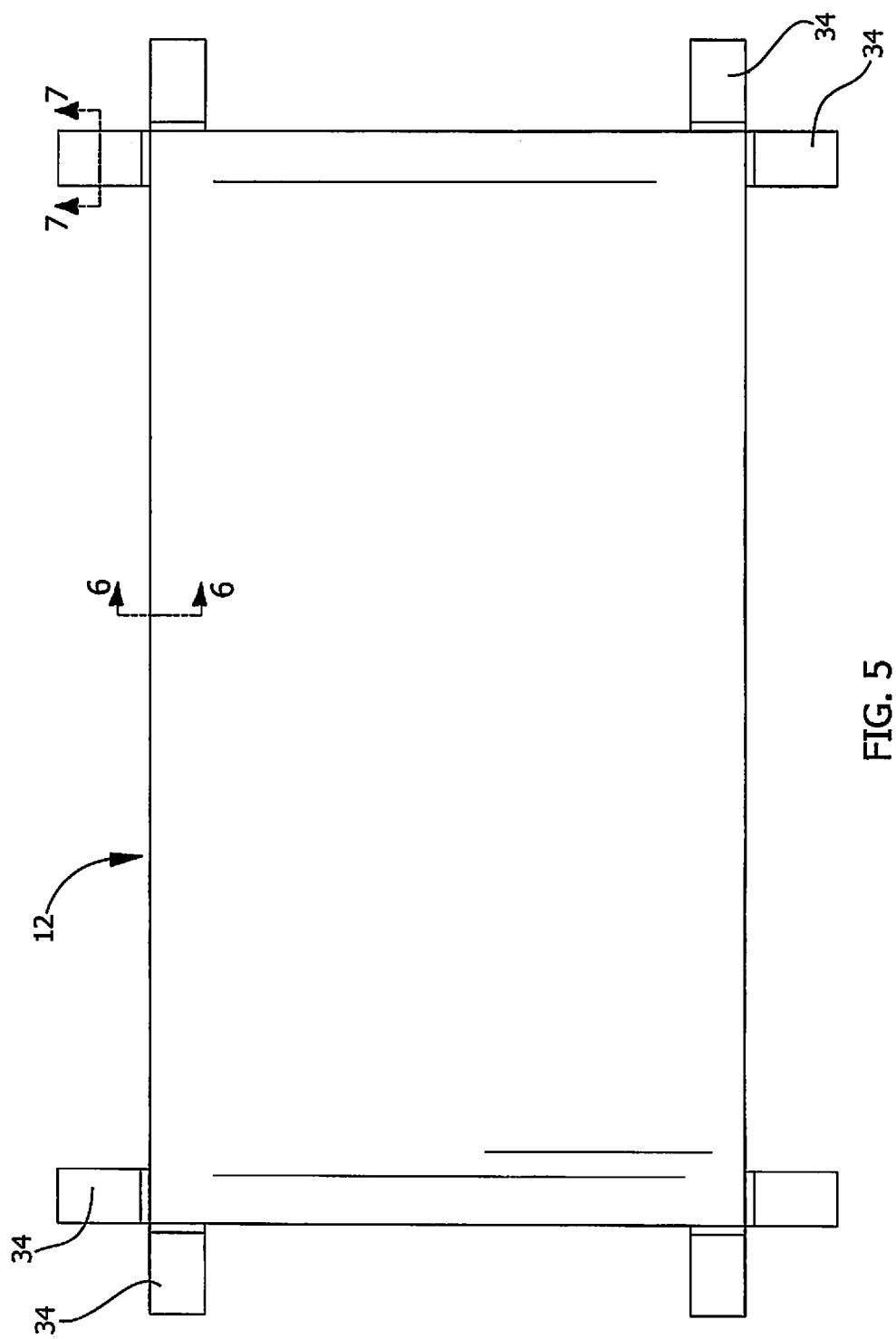
FIG. 5 is a front view of an embodiment of the disclosure.
Figure 6:
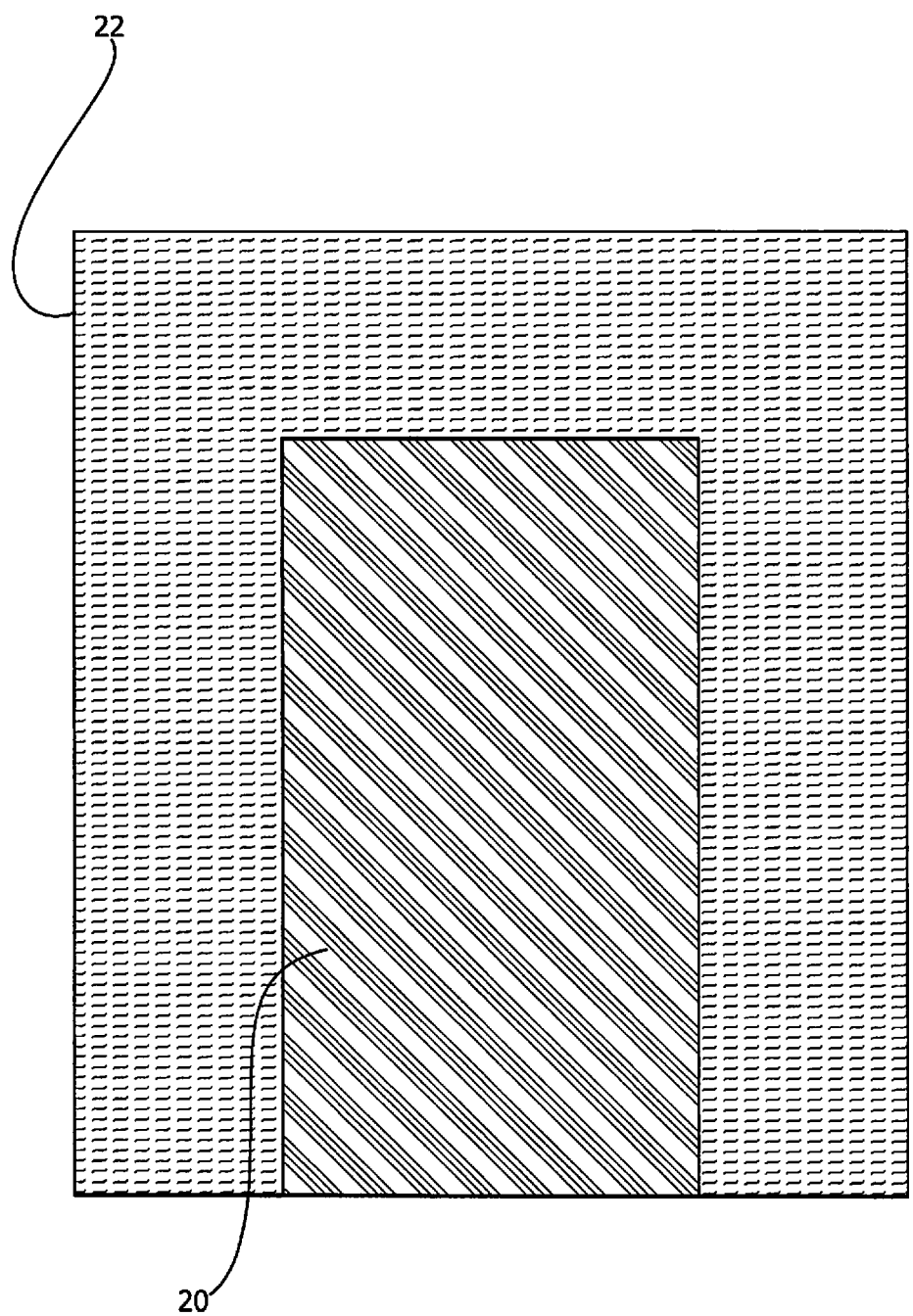
FIG. 6 is a cross sectional view taken along line 6-6 of FIG. 5 of an embodiment of the disclosure.
Figure 7:
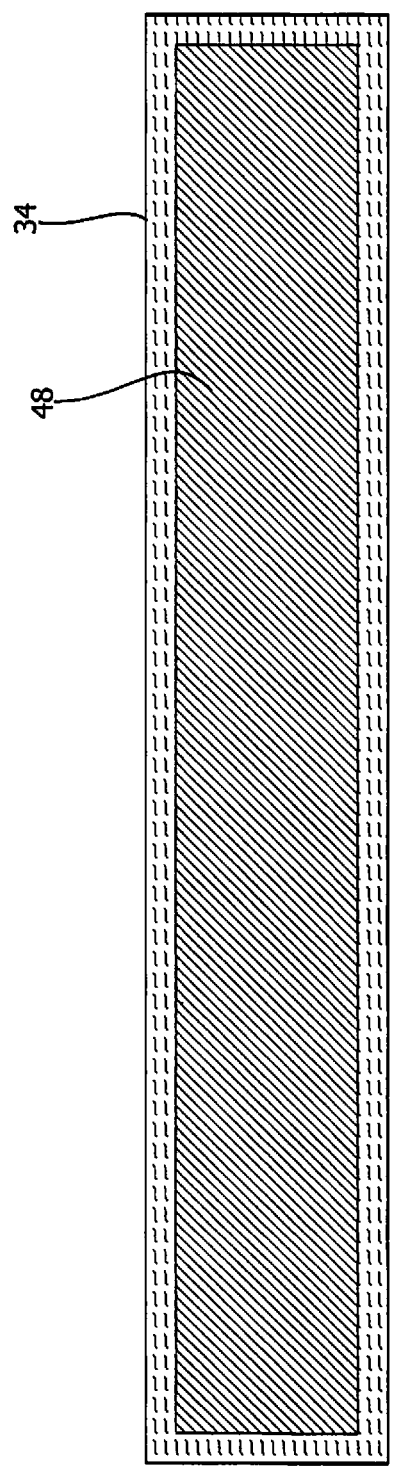
FIG. 7 is a cross sectional view taken along line 7-7 of FIG. 5 of an embodiment of the disclosure.
Figure 8:
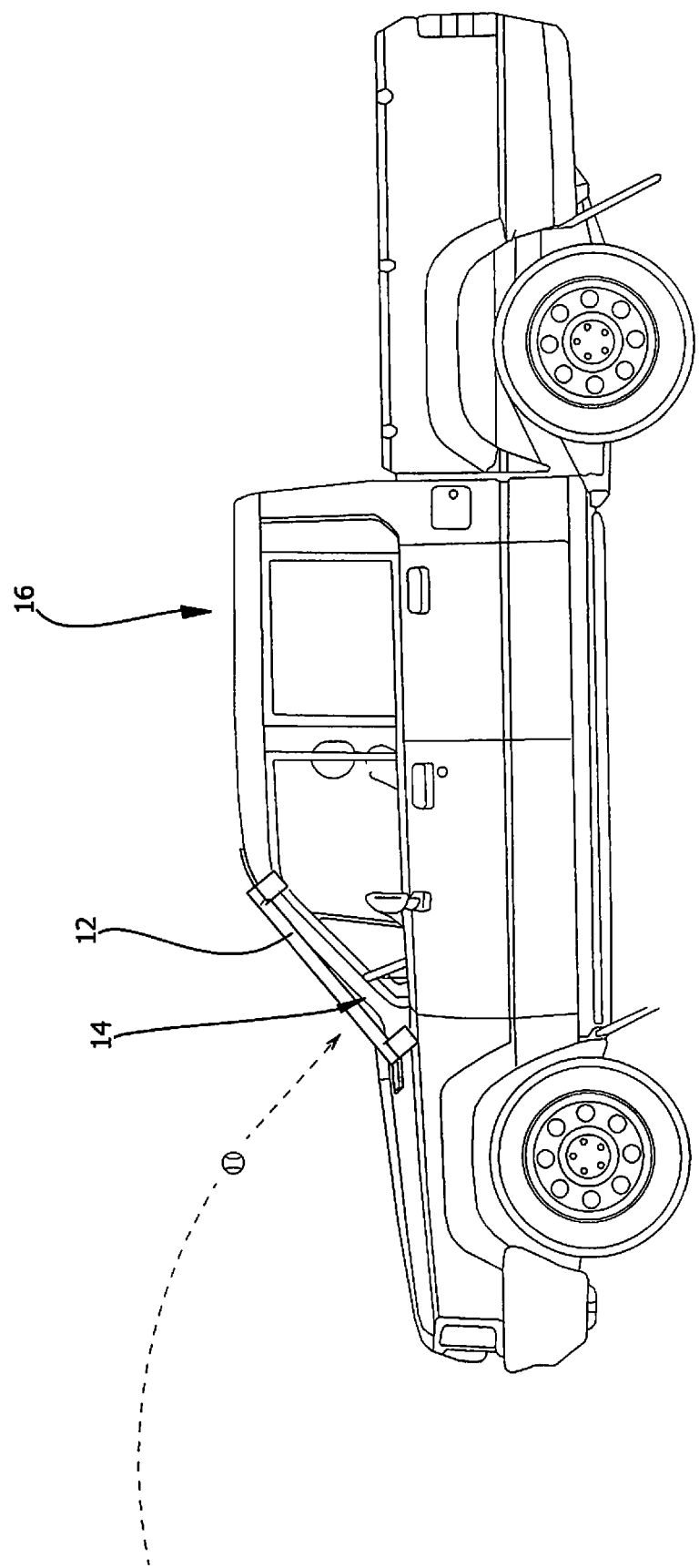
FIG. 8 is a perspective in-use view of an embodiment of the disclosure.

With reference now to the drawings, and in particular to FIGS. 1 through 8 thereof, a new windshield protection device embodying the principles and concepts of an embodiment of the disclosure and generally designated by the reference numeral 10 will be described.

As best illustrated in FIGS. 1 through 8, the windshield protection cushion device 10 generally comprises a mat 12 is positionable over a windshield 14 of a vehicle 16 to inhibit the windshield 14 from being struck by a projectile 16. The mat 12 has a resiliently compressible element 18 that is integrated into the mat 12 to absorb impact energy from the projectile 16. In this way the mat 12 inhibits the windshield 14 from being damaged by the projectile 16. The vehicle 16 may be a passenger vehicle that is parked at a baseball field, for example, and the projectile 16 may be a baseball that was inadvertently batted out of the baseball field.

The mat 12 includes an inner layer 20 that is completely surrounded by an outer layer 22. The inner layer 20 is comprised of a resiliently compressible material, including but not being limited to rubber or silicone, such that the inner layer 20 defines the resiliently compressible element 18. The outer layer 22 is comprised of a fluid impermeable material, including but not being limited to chemically treated canvas or polyurethane, to protect the inner layer 20 from precipitation. The outer layer 22 has a perimeter edge 24 which has a top side 26, a bottom side 28, a first lateral side 30 and a second lateral side 32.

A plurality of tabs 34 is provided and each of the plurality of tabs 34 is coupled to and extends away from the mat 12. The plurality of tabs 34 is strategically positioned on the mat 12 thereby facilitating each of the plurality of tabs 34 to be folded onto a respective body panel 36 of the vehicle 16 when the mat 12 is positioned on the windshield 14. Each of the plurality of tabs 34 has an engaging element 38 which releasably engages the respective body panel 36 for retaining the mat 12 on the windshield 14. The plurality of tabs 34 includes a top set of tabs 40, a bottom set of tabs 42, a first lateral set of tabs 44 and a second lateral set of tabs 46.

Each of the top set of tabs 40 is positioned on the top side 26 of the perimeter edge 24 of the outer layer 22 of the mat 12 adjacent to respective ends of the top side 26. Each of the bottom set of tabs 42 is positioned on the bottom side 28 of the perimeter edge 24 adjacent to respective ends of the bottom side 28. Continuing, each of the first lateral set of tabs 44 is positioned on the first lateral side 30 of the perimeter edge 24 adjacent to respective ends of the first lateral side 30. Finally, each of the second lateral set of tabs 46 is positioned on the second lateral side 32 of the perimeter edge 24 adjacent to respective ends of the second lateral side 32.

Each of the plurality of tabs 34 is comprised of a fluid impermeable material, including but not being limited to chemically treated canvas or polyurethane. Additionally, each of the plurality of tabs 34 is comprised of a deformable material thereby facilitating each of the plurality of tabs 34 to be folded onto the mat 12 for storage. The mat 12 is rollable into a roll when the tabs 34 are folded onto the mat 12 for storing the mat 12. A magnet 48 is each integrated into each of the plurality of tabs 34 such that each of the magnet 48 associated with a respective tab 34 defines the engaging element 38 of the respective tab 34. Each of the plurality of magnets 48 magnetically engages the respective body panel 36 of the vehicle 16 upon which the respective tab 34 is positioned for retaining the mat 12 on the windshield 14.

A storage bag 50 is provided to containing the mat 12 when the mat 12 is rolled up for storing and transporting the mat 12. A drawstring 52 is integrated into the storage bag 50 and the drawstring 52 extends around an opening 54 defined by a top edge 56 of the storage bag 50 having each of a pair of ends 58 of the drawstring 52 being exposed. In this way the opening 54 can be closed by pulling on the pair of ends 58 of the drawstring 52. The drawstring 52 includes a slide 60 that is slidably positioned on the drawstring 52 to facilitate the storage bag 50 to be retained in a closed orientation. Additionally, the storage bag 50 has a handle 62 that is coupled to an outer surface 64 of the storage bag 50 for carrying the storage bag 50.

In use, the mat 12 is placed on the windshield 14 of the vehicle 16 and each of the tabs 34 is laid onto the respective body panel 36 to facilitate the magnets 48 to magnetically engage the body panels 36. In this way the mat 12 absorbs impact energy from the projectile 16 in the event that the projectile 16 is inadvertently directed at the windshield 14. The tabs 34 are folded over onto the mat 12 and the mat 12 is rolled up for storage in the storage bag 50. In this way the mat 12 can be easily transported in the vehicle 16 for future use.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windshield protection cushion device for protecting a windshield of a vehicle from being struck by a baseball when the vehicle is parked at a baseball diamond, said device comprising:

a mat being positionable over a windshield of a vehicle wherein said mat is configured to inhibit said windshield from being struck by a projectile, said mat having a resiliently compressible element being integrated into said mat wherein said resiliently compressible element is configured to absorb impact energy from the projectile thereby inhibiting the windshield from being damaged by the projectile;

a plurality of tabs, each of said plurality of tabs being coupled to and extending away from said mat, said plurality of tabs being strategically positioned on said mat thereby facilitating each of said plurality of tabs to be folded onto a respective body panel of said vehicle when said mat is positioned on said windshield, each of said plurality of tabs having an engaging element which releasably engages said respective body panel for retaining said mat on said windshield, said plurality of tabs including a top set of tabs, a bottom set of tabs, a first lateral set of tabs and a second lateral set of tabs, each of said plurality of tabs being comprised of a deformable material thereby facilitating each of said plurality of tabs to be folded onto said mat for storage, each of said first lateral set of tabs being foldable over a corresponding tab of said top set of tabs and a corresponding tab of said bottom set of tabs, each of said second lateral set of tabs being foldable over an associated tab of said top set of tabs and an associated tab of said bottom set of tabs; and a storage bag for receiving said mat when said mat is rolled up for storing and transporting said mat.

2. The device according to claim 1, wherein:

said mat comprises an inner layer being completely surrounded by an outer layer;

said inner layer is comprised of a resiliently compressible material such that said inner layer defines said resiliently compressible element;
said outer layer is comprised of a fluid impermeable material wherein said outer layer is configured to protect said inner layer from precipitation;
said outer layer has a perimeter edge which has a top side and a bottom side and a first lateral side and a second lateral side;
each of said top set of tabs is positioned on said top side of said perimeter edge of said outer layer of said mat adjacent to respective ends of said top side;
each of said bottom set of tabs is positioned on said bottom side of said perimeter edge adjacent to respective ends of said bottom side;
each of said first lateral set of tabs is positioned on said first lateral side of said perimeter edge adjacent to respective ends of said first lateral side; and
each of said second lateral set of tabs is positioned on said second lateral side of said perimeter edge adjacent to respective ends of said second lateral side.

3. The device according to claim 1, wherein:
each of said plurality of tabs is comprised of a fluid impermeable material;
each of said plurality of tabs is comprised of a deformable material thereby facilitating each of said plurality of tabs to be folded onto said mat for storage; and
said mat being rollable into a roll when said tabs are folded onto said mat for storing said mat.

4. The device according to claim 1, further comprising a plurality of magnets, each of said plurality of magnets being integrated into a respective one of said plurality of tabs such that each of said plurality of magnets defines said engagement element of said respective tab.

5. The device according to claim 4, wherein each of said plurality of magnets magnetically engaging said respective body panel of said vehicle upon which said respective tab is positioned for retaining said mat on said windshield.

6. The device according to claim 1, wherein said storage bag has a drawstring being integrated into said storage bag, said drawstring extending around an opening defined by a top edge of said storage bag having each of a pair of ends of said drawstring being exposed thereby facilitating said opening to be closed by pulling on said pair of ends of said drawstring, said drawstring including a slide being slidably positioned on said drawstring to facilitate said storage bag to be retained in a closed orientation, said storage bag having a handle being coupled to an outer surface of said storage bag for carrying said storage bag.

7. A windshield protection cushion device for protecting a windshield of a vehicle from being struck by a baseball when the vehicle is parked at a baseball diamond, said device comprising:
a mat being positionable over a windshield of a vehicle wherein said mat is configured to inhibit said windshield from being struck by a projectile, said mat having a resiliently compressible element being integrated into said mat wherein said resiliently compressible element is configured to absorb impact energy from the projectile thereby inhibiting the windshield from being damaged by the projectile, said mat comprising an inner layer being completely surrounded by an outer layer, said inner layer being comprised of a resiliently compressible material such that said inner layer defines said resiliently compressible element, said outer layer being comprised of a fluid impermeable material wherein said outer layer is configured to protect said inner layer from precipitation, said outer layer having a perimeter edge which has a top side and a bottom side and a first lateral side and a second lateral side;
a plurality of tabs, each of said plurality of tabs being coupled to and extending away from said mat, said plurality of tabs being strategically positioned on said mat thereby facilitating each of said plurality of tabs to be folded onto a respective body panel of said vehicle when said mat is positioned on said windshield, each of said plurality of tabs having an engaging element which releasably engages said respective body panel for retaining said mat on said windshield, said plurality of tabs including a top set of tabs and a bottom set of tabs and a first lateral set of tabs and a second lateral set of tabs, each of said top set of tabs being positioned on said top side of said perimeter edge of said outer layer of said mat adjacent to respective ends of said top side, each of said bottom set of tabs being positioned on said bottom side of said perimeter edge adjacent to respective ends of said bottom side, each of said first lateral set of tabs being positioned on said first lateral side of said perimeter edge adjacent to respective ends of said first lateral side, each of said second lateral set of tabs being positioned on said second lateral side of said perimeter edge adjacent to respective ends of said second lateral side, each of said plurality of tabs being comprised of a fluid impermeable material, each of said plurality of tabs being comprised of a deformable material thereby facilitating each of said plurality of tabs to be folded onto said mat for storage, each of said first lateral set of tabs being foldable over a corresponding tab of said top set of tabs and a corresponding tab of said bottom set of tabs, each of said second lateral set of tabs being foldable over an associated tab of said top set of tabs and an associated tab of said bottom set of tabs, said mat being rollable into a roll when said tabs are folded onto said mat for storing said mat;
a plurality of magnets, each of said plurality of magnets being integrated into a respective one of said plurality of tabs such that each of said plurality of magnets defines said engagement element of said respective tab, each of said plurality of magnets magnetically engaging said respective body panel of said vehicle upon which said respective tab is positioned for retaining said mat on said windshield; and
a storage bag for receiving said mat when said mat is rolled up for storing and transporting said mat, said storage bag having a drawstring being integrated into said storage bag, said drawstring extending around an opening defined by a top edge of said storage bag having each of a pair of ends of said drawstring being exposed thereby facilitating said opening to be closed by pulling on said pair of ends of said drawstring, said drawstring including a slide being slidably positioned on said drawstring to facilitate said storage bag to be retained in a closed orientation, said storage bag having a handle being coupled to an outer surface of said storage bag for carrying said storage bag.

* * * * *